No. 607,480. Patented July 19, 1898.
F. H. RICHARDS.
AUTOMATIC WEIGHING MACHINE.
(Application filed Nov. 5, 1897.)
(No Model.) 6 Sheets—Sheet 1.

Fig. 1.

Witnesses;
O. W. Smith
Fred. J. Dole

Inventor:
F. H. Richards

No. 607,480. Patented July 19, 1898.
F. H. RICHARDS.
AUTOMATIC WEIGHING MACHINE.
(Application filed Nov. 5, 1897.)
(No Model.) 6 Sheets—Sheet 2.

Fig. 2.

Witnesses:
O. W. Smith
Fred. J. Dole

Inventor:
F. H. Richards

No. 607,480. Patented July 19, 1898.
F. H. RICHARDS.
AUTOMATIC WEIGHING MACHINE.
(Application filed Nov. 5, 1897.)

(No Model.) 6 Sheets—Sheet 3.

Fig. 3.

Witnesses: O. W. Smith
Fred. J. Dole.

Inventor: F. H. Richards.

No. 607,480. Patented July 19, 1898.
F. H. RICHARDS.
AUTOMATIC WEIGHING MACHINE.
(Application filed Nov. 5, 1897.)

(No Model.) 6 Sheets—Sheet 4.

Fig. 4.

Witnesses;
O. W. Smith
Fred. J. Dole.

Inventor;
F. H. Richards.

No. 607,480. Patented July 19, 1898.
F. H. RICHARDS.
AUTOMATIC WEIGHING MACHINE.
(Application filed Nov. 5, 1897.)

(No Model.) 6 Sheets—Sheet 5.

Witnesses:
O. W. Smith
Fred. J. Dole.

Inventor:
F. H. Richards

No. 607,480. Patented July 19, 1898.
F. H. RICHARDS.
AUTOMATIC WEIGHING MACHINE.
(Application filed Nov. 5, 1897.)
(No Model.) 6 Sheets—Sheet 6.

Witnesses:
O. W. Smith
Fred. J. Dole.

Inventor:
F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 607,480, dated July 19, 1898.

Application filed November 5, 1897. Serial No. 657,519. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines, the object thereof being to provide an improved machine of this character for automatically weighing and delivering various kinds of material.

The invention includes as one of its features a supply apparatus involving two fixed spout-sections, an intermediate movably-mounted spout-section, and means controlled by the weighing mechanism for positively operating said movably-mounted spout-section during the weighing operation, and in the present case said movably-mounted spout-section is annular and is reciprocated or vibrated during the load-supplying period, by reason of which the material composing the supply-stream is loosened up to insure its free feed. The supply apparatus also includes a valve and a carrier therefor mounted for reciprocation in transverse directions and means for reciprocating the valve relatively to its carrier as said valve closes, whereby the supply is further agitated and all liability of the valve to stick during its closing movement is eliminated.

Another feature of the invention resides in a load-receiver having a series of two tubular closers fitting against each other to prevent the escape of material, and these closers are preferably maintained shut by a locker. This locker may consist of a dead-lock toggle, in which case an actuator is provided to break the same, such actuator being held ineffective by a detent of suitable construction during the passage of the supply into the load-receiver. When, however, the toggle breaker or actuator is released, the closers will be free to open, this operation being effected by the weight of the mass supported upon said closers.

In the drawings accompanying and forming part of this specification.

Similar characters designate like parts in all the figures of the drawings.

The framework for supporting the different parts of the machine consists of the chambered base 2, the side frames 3 and 4, mounted on the base and surmounted by the brackets 5 and 6, extending oppositely from the stationary spout or hopper II, forming part of the supply apparatus.

The weighing mechanism comprises a load-receiver, as G, and supporting-beams, as B and B', said beams being mounted upon the base of the machine, and the load-receiver being supported upon the poising or inner ends of the beams in the manner shown in Letters Patent No. 548,840, granted to me October 29, 1895, to which reference may be had.

The load-receiver G is substantially similar to that shown in the patent mentioned, except that in the present case it terminates in a plurality of separated spouts, as 10 and 12, the discharge of material from which is controlled by a corresponding series of tubular closers L and L', pivoted to the respective spouts, as at 13 and 14, for oscillation, said closers fitting against each other when shut to prevent the escape of material. The upper walls 15 and 16 and the lower walls 17 and 18 of the two closers fit against each other when shut, as indicated in Fig. 9, and the side walls 19 of the closer L' overlap the corresponding side walls 20 of the coöperating closer L when shut, and by reason of this construction the escape of material is prevented during the loading period.

Figure 9:
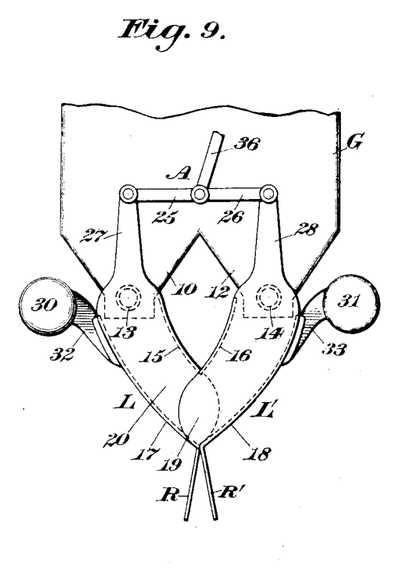
Figs. 9 and 10 are views of the closer mechanism, the closers being represented, respectively, in their shut and open positions.
Figure 10:
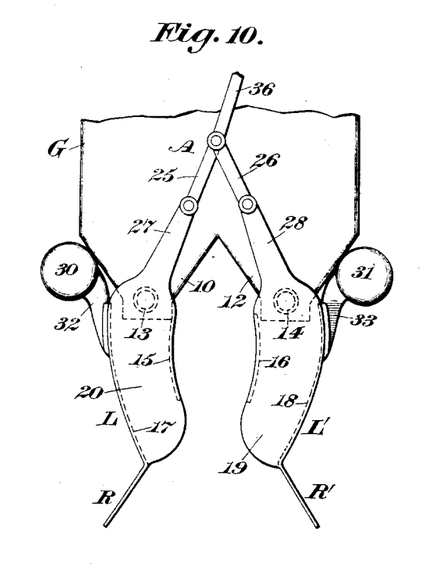

To hold the closers shut, as represented in Fig. 9, I have provided a locker, as A, consisting, preferably, of a dead-lock toggle, the links 25 and 26 of which are pivoted to the upright arms 27 and 28, extending, respectively, from the closers L and L', the toggle being shown in its effective position in Fig. 9, at which time the several pivots of the same are approximately in horizontal line. When the toggle is flexed, the two closers will be free to open, and this operation is accomplished by the weight of the mass contained within the same, the material forcing or spreading them apart, as indicated in Fig. 10, to permit the load to be discharged from the receiver G.

For the purpose of retarding the shutting movement of the closers toward each other a sufficient length of time to assure the complete emptying of the load-receiver I provide closer-retarding mechanism (designated by R and R') consisting of regulator blades or plates secured to and extending at an angle from the lower closer-walls 17 and 18. When the closers open and the load is discharged, the regulators will be acted upon by the discharging material to such an extent as to check the return movement of the two closers. When the material is completely discharged from the load-receiver and closers, the latter will be shut by the weights 30 and 31, secured to the arms 32 and 33, extending oppositely from the respective closers.

The toggle-breaker may be of any suitable construction, it consisting in the present case of a weighted lever T, secured to the transverse rock-shaft 35, mounted upon the upper side of the load-receiver, and the lever is connected with the toggle by a link 36, pivoted, respectively, to said parts. The upper arm 36' of the toggle actuator or breaker carries the weight 37, and when said weight drops the link 36 will be raised, thereby throwing the several pivots of the toggle out of line to free the two closers.

The toggle actuator or breaker T is held in its ineffective position during the load-supplying period by a detent or latch, as D, of ordinary construction, pivoted upon the load-receiver, as at 38, the hook 39 of the latch engaging the toggle-breaker T to hold it against action. When the hook is disengaged from the toggle-breaker T, the opening of the closers will follow.

Figure 1:
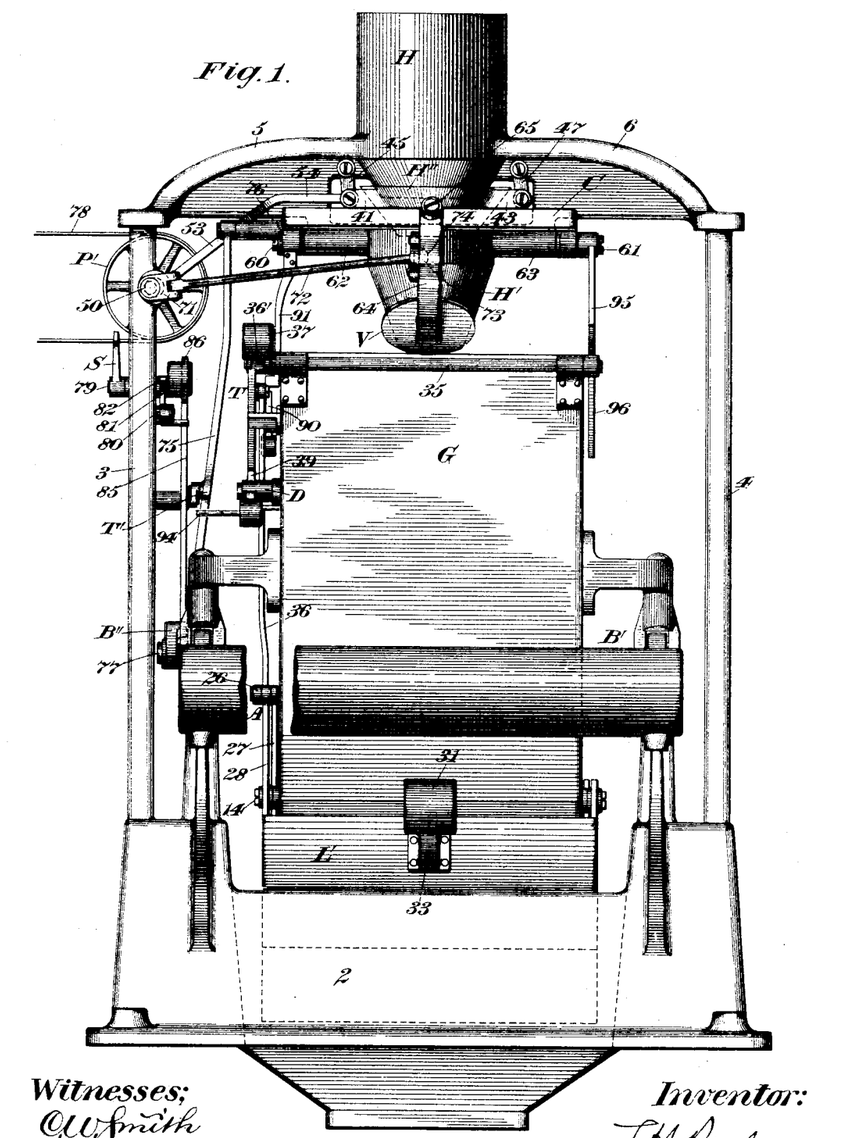
Figure 1 is a rear elevation of my improved weighing-machine.
Figure 8:
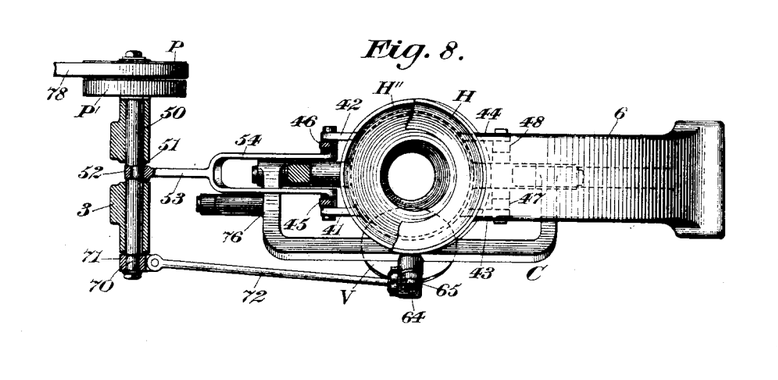
Fig. 8 is a plan view of the supply apparatus with portions broken away.

The supply apparatus involves spout-sections, as H, H', and H'', the sections H and H' being fixed upon the framework, while the intermediate section H'' is supported for reciprocatory movement in the space 40 in said framework. The spout-section H'' is annular, and it is provided at opposite sides thereof with the projecting arms 41 and 42 and 43 and 44, to which the links 45 and 46 and 47 and 48, respectively, are pivoted, said links being similarly jointed to the framework, as shown in Figs. 1 and 8, at opposite sides of the spout H. The spout-section H'' is reciprocated during the making up of a load to insure the free flow of the material toward the load-receiver G, and it may be operated from the shaft 50, carried by the side frame 3. (See Fig. 8.) The shaft 50 has the crank 51, embraced by the ring or sleeve 52 of the connector 53, the latter being bifurcated, as at 54, and the branches of the bifurcation being pivoted to the links 45 and 46, respectively. It will be apparent that on the rotation of the shaft the spout-section H'' will be vibrated back and forth to loosen up the supply, the motion of the shaft being stopped on the completion of the load.

The means illustrated for driving the shaft and for throwing it out of action on the completion of a load will be hereinafter described.

The means represented for controlling the supply-stream consists in the present case of a valve, as V, supported by the yoke-shaped carrier C, the pivots 60 and 61 entering hubs at the inner extremities of the two arms of the yoke and being seated in the bearings 62 and 63, respectively, extending oppositely from the stationary spout-section H'. The valve V is in the form of a disk closable beneath the outlet of the spout-section H' to cut off the supply, and it is secured to the arm 64, pivoted, as at 65, to the longitudinal member of the carrier C, as indicated in Figs. 1 and 8, the valve being oscillatory in a plane transverse to that of the carrier and being closed by the weight of the yoke. The valve is vibrated or reciprocated in a direction corresponding with that of the spout-section H' and transversely to the path of oscillation of the carrier C, and it serves when thus operated to loosen up the supply.

As a means for operating the valve V during its closure it may be connected with the crank-shaft 50. The crank-shaft 50 has at its outer end the crank 70, loosely embraced by the ring 71, to which the link 72 is pivoted, the link terminating in the ball 73, fitting in a socket 74 in the arm 64, and it will be seen that when the shaft is rotated the valve will be moved back and forth to cause a free flow of the supply-stream from the stationary spout-section H'.

The valve V is closed by the weight of the carrier C, such action being limited, however, by the weighing mechanism acting through the longitudinal rod 75, said rod being pivoted to an arm 76 of the carrier and its free end bearing against one end of the auxiliary beam B'', pivoted, as at 77, upon the beam B', the inner end of said auxiliary beam descending simultaneously with the load-receiver G, and as it falls away from the rod 75 the carrier C can drop to swing the valve V under the outlet of the spout-section H', this operation being concluded when the load in the receiver G is completed. On the return of the auxiliary beam B'' to its primary position it imparts an upward thrust to the rod 75, which is communicated to the valve V for swinging the same open or from under the spout-section H'.

Figure 2:
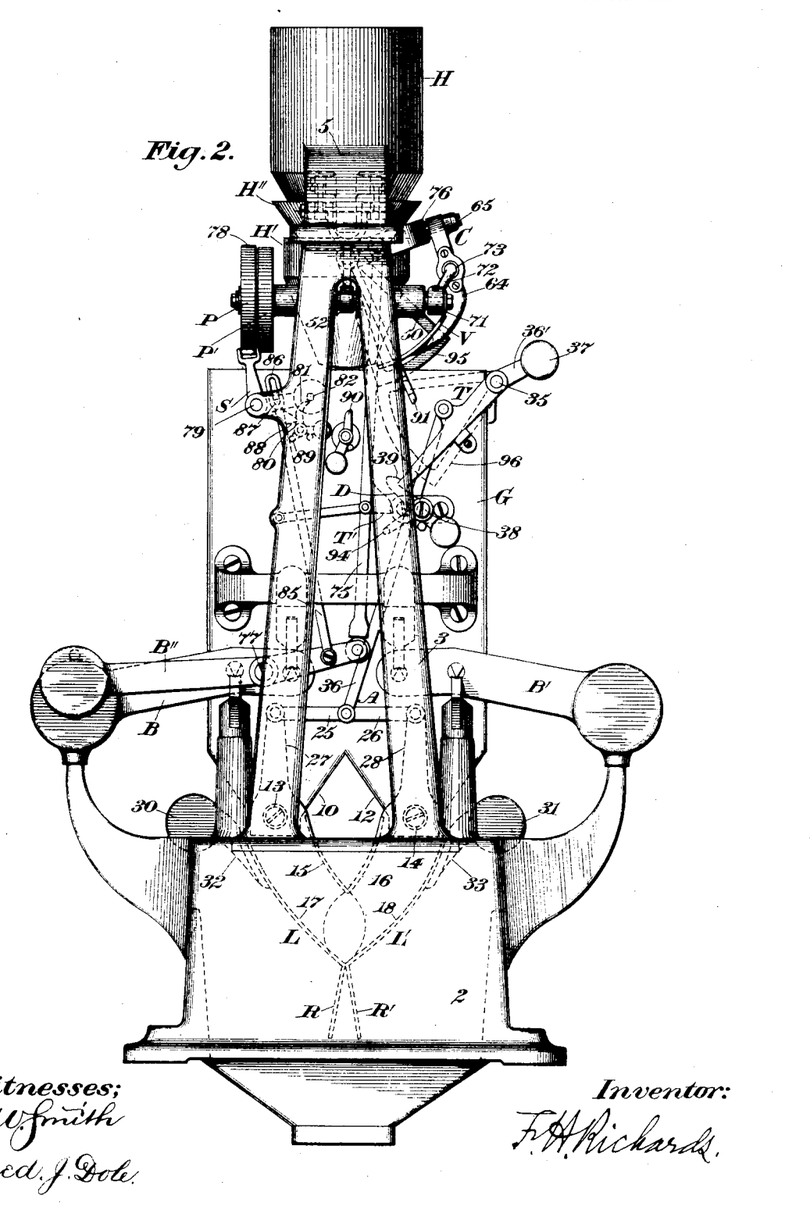
Figs. 2, 3, and 4 are side elevations of the same as seen from the left in Fig. 1 and show the positions occupied by the different parts during the making and discharging of a load.

Any suitable means may be provided for driving the shaft 50, a belt 78 being shown for this purpose, the belt 78 being shiftable from the tight pulley P to the loose pulley P' of said shaft to stop the operation of the several feed devices. The belt 78 is shifted from the pulley P to the pulley P' and back again by a shipper, as S, consisting of a gravitative lever pivoted, as at 79, to the side frame 3, said part having the usual fingers between which the belt travels. The belt-shipper S is maintained in its primary position (shown in Fig. 2) by a detent, such as 80, pivoted upon the framework, the arm 81 of said detent being adapted to engage the pin 82 on the belt-shipper, as shown in Fig. 2, whereby the belt 78 is caused to run on the tight pulley P. When the pivoted detent 80 is tripped, the weighted arm 81 is free to drop, thereby swinging the working arm thereof to what is indicated herein as the "right," so that the belt 78 is transferred from the tight pulley P to the loose pulley P'.

The means for tripping the detent 80 to throw the several force-feeding devices out of action is connected, preferably, with the beam mechanism and will now be described.

Figure 4:
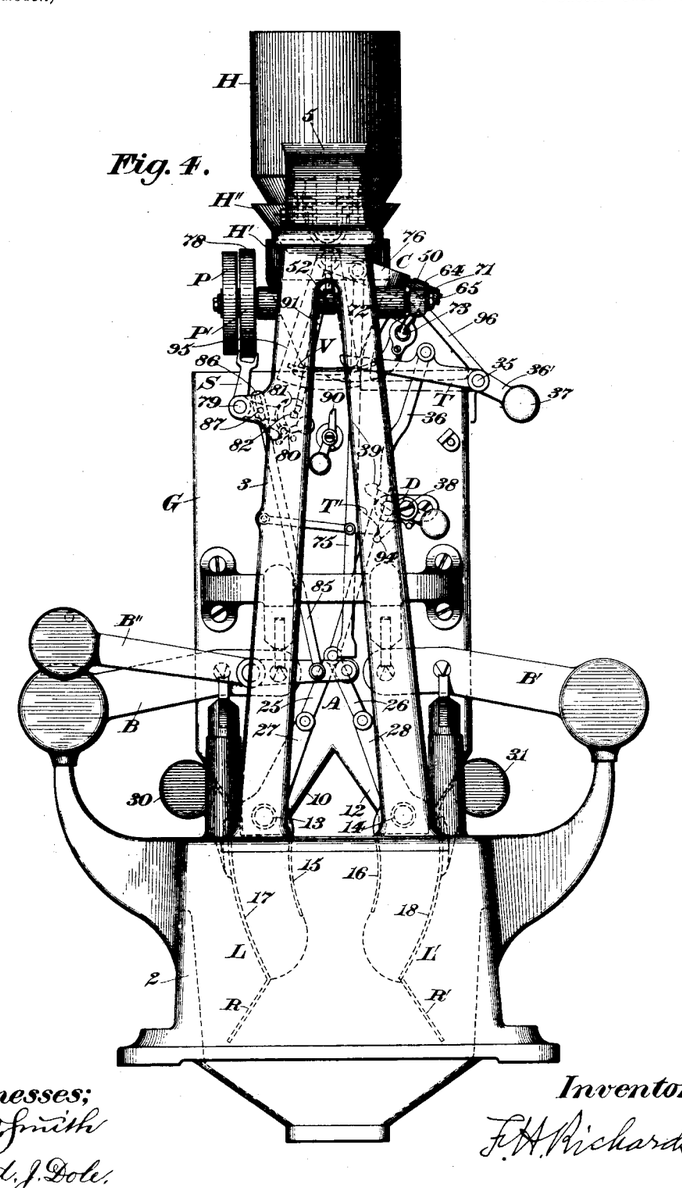
Figure 5:
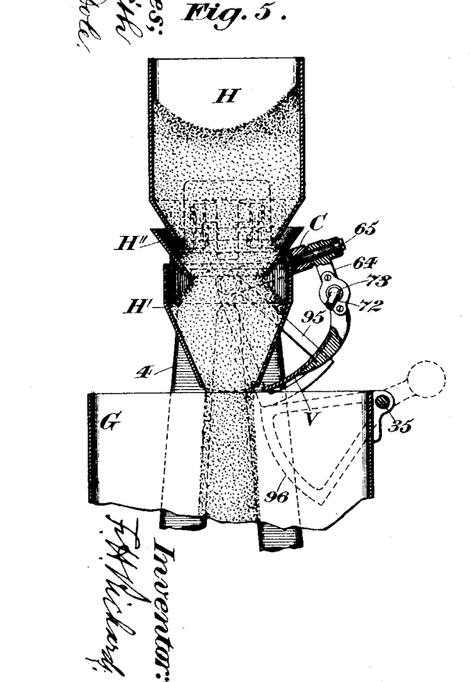
Figs. 5, 6, and 7 are longitudinal central sections of the supply apparatus and the upper portion of the load-receiver, the parts being in positions corresponding, respectively, with Figs. 2, 3, and 4.
Figure 6:
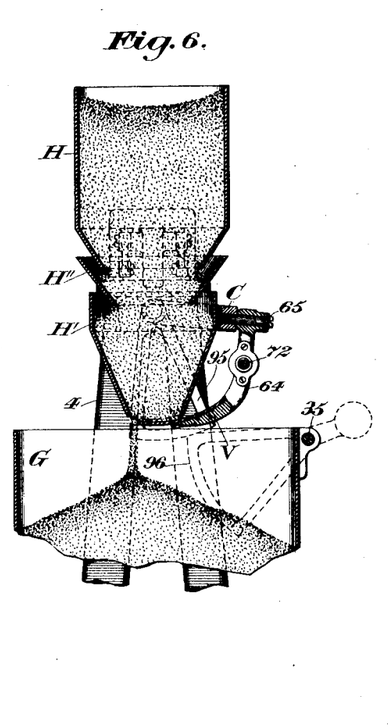
Figure 7:
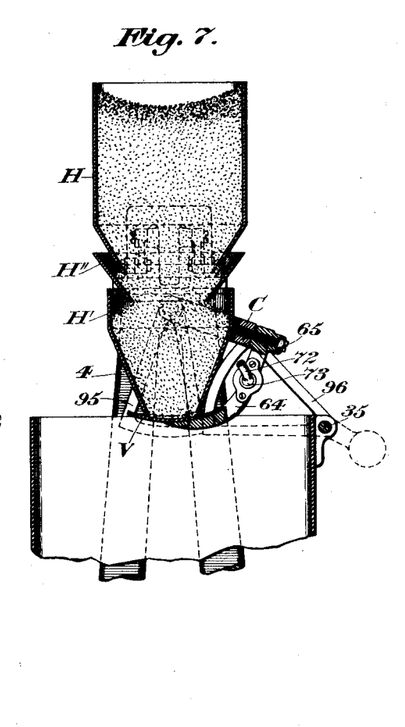

A rod is shown at 85 pivoted at its lower end to the poising side of the auxiliary beam B'', the rod having at its upper end the loop 86, embracing the pin 87 on the weighted arm of the belt-shipper, and near its upper end the tripper 88. When the load is substantially completed, the tripper 88 will be in contact with the pin 89 on the detent 80, having been moved to such position by the descent of the weighing mechanism, and when the load is fully completed the detent 80 will be operated by the tripper 88 to disengage the same from the pin 82 on the weighted arm 81 of the belt-shipper, so that said weighted arm is free to drop and the belt-shipper on such action will shift the belt 78 from the pulley P to the pulley P', the valve V at this time having reached its fully-closed position, as shown in Fig. 4. On the return of the auxiliary beam B'' it serves to reset the belt-shipper S—that is, the rod 85 is elevated, thereby raising the weighted arm 81 of the belt-shipper and swinging the working arm of said belt-shipper to transfer the belt to the tight pulley P, and when the shipper reaches its normal position (shown at Fig. 2) it is engaged by the detent 80.

Figure 3:
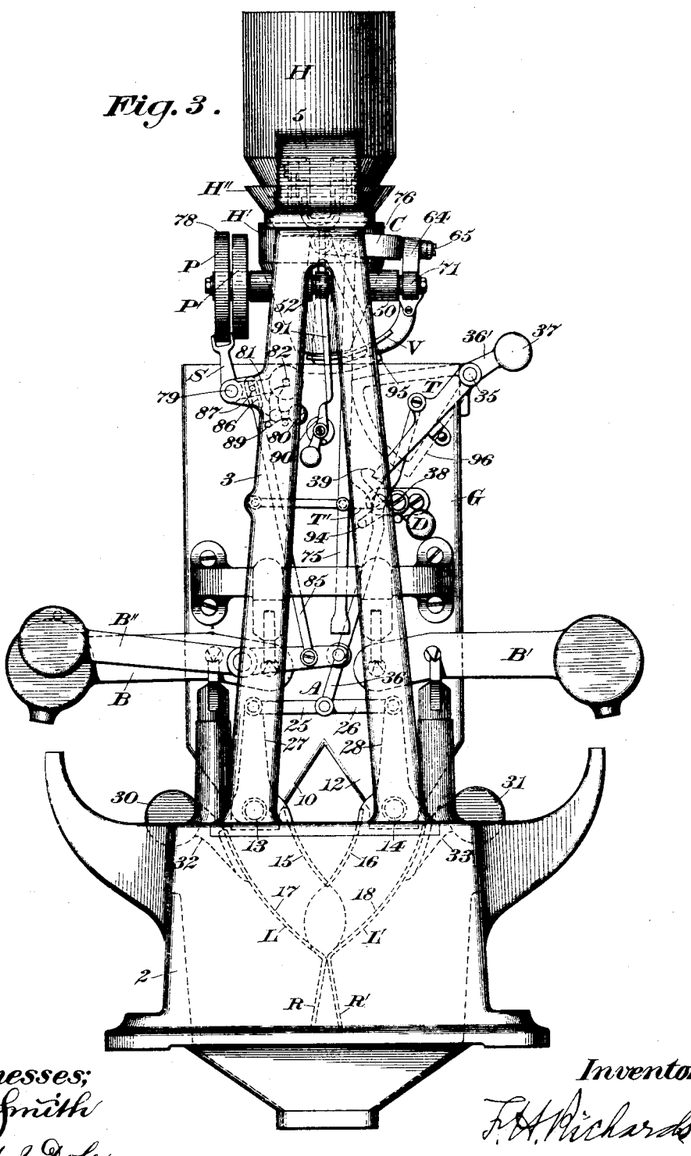

The closure of the valve is interrupted when it nearly reaches the end of its cut-off stroke, so as to permit a drip or reduced stream to enter the load-receiver to complete the load. The means shown for intercepting the valve consists of the by-pass stop 90, familiar in this art, disposed in the path of the depending rod 91, fixed to the arm 76 of the valve-carrier C. When the stream has been nearly cut off, the lower end of the rod 91 will abut against the by-pass stop 90, pivoted to the load-receiver, so as to momentarily arrest the shutting of the valve, as shown in Fig. 3. When the load is completed, the receiver G will descend and carry the upper end of the by-pass below the arc of oscillation of the rod 91, thereby releasing the valve V, so that its carrier C can drop, which results in swinging the valve under the outlet of the spout-section H' to stop the supply.

For tripping the latch D the rod 75 is conveniently furnished with the tripper T'', consisting of a projection adapted to impinge against the pin 94 on said latch on the completion of the load, thereby disengaging said latch from the toggle-breaker T, whereby the weight 37 of the latter can drop to flex the toggle members 25 and 26.

The machine is equipped with the usual interlocking stops, designated, respectively, by 95 and 96, operative, respectively, with the valve and closer in the manner shown in the Letters Patent hereinbefore referred to, the stop 95 being secured to the carrier C, while the coöperating stop 96 is fixed to the transverse rock-shaft 35.

The operation of the hereinbefore-described machine, briefly stated, is as follows: In Fig. 2 the closers are represented shut and held in such position by the toggle members 25 and 26, which are maintained in their dead-center position by the latch D engaging the toggle-breaker T. At this time the valve V is wide open and the belt 78 is on the tight pulley P, whereby the shaft 50 will be rotated to reciprocate the spout H'' and the valve V to loosen up the supply. The valve being wide open, the full volume of the supply will enter the empty load-receiver and bear the latter down when a predetermined part of the load has been received. The inner end of the auxiliary beam will fall with the load-receiver and away from the rod 75, permitting the carrier C to drop and to swing the valve V under the outlet of the stationary hopper-section H'. When the load is almost completed, the fixed rod 91, operative with the valve, will strike the by-pass stop 90 on the load-receiver, as shown in Fig. 3, which results in momentarily stopping the valve, and at this time the valve is transversely vibrated to insure the feed of the drip-stream into the nearly-loaded receiver. On the completion of the load the by-pass stop 90 will descend below the front end of the rod 91, and at this time the tripper 88 will strike the pin 89 on the detent 80, thereby disengaging said detent from the pin 82 on the weighted arm 81 of the belt-shipper, so that said weighted arm can drop to shift the belt 78 from the tight pulley P to the loose pulley P'. About the time the belt is shipped and the valve is fully closed the tripper T' strikes the pin 94 on the latch D, as indicated in Fig. 4, thereby releasing the toggle-breaker T, so that the latter can flex the toggle-links 25 and 26 to release the two closers. When the closers are released, they are swung open to discharge the load, and when the load is discharged the weights 30 and 31 shut the closers, after which the several parts are returned to their primary positions to repeat the operation.

Having described my invention, I claim—

1. The combination, with weighing mechanism including a load-receiver, of a series of tubular closers fitting against each other to prevent the escape of material.

2. The combination, with weighing mechanism including a load-receiver having a series of spouts, of a corresponding series of tubular closers connected with the respective spouts and fitting against each other to prevent the escape of material.

3. The combination, with weighing mechanism including a load-receiver, of a series of tubular closers, the upper and lower walls of said closers fitting against each other to prevent the escape of material.

4. The combination, with weighing mechanism including a load-receiver, of a plurality of tubular closers the upper and lower walls of which fit against each other, said closers being provided with side walls, the side walls of one closer overlapping the side walls of the other closer.

5. The combination, with weighing mechanism including a load-receiver having a plurality of spouts, of a corresponding series of counterweighted tubular closers pivoted to the respective spouts and fitting against each other to prevent the escape of material.

6. The combination, with weighing mechanism including a load-receiver, of a series of tubular closers fitting against each other to prevent the escape of material; a locker for said closers; and means for effecting the release of said closers.

7. The combination, with weighing mechanism including a load-receiver, of closer mechanism controlling the discharge of the load; a toggle for locking the closer mechanism; a gravitative toggle-breaking device mounted on the load-receiver; a detent for holding said toggle-breaking device against action; a supply apparatus; and means operative with the supply apparatus for tripping said detent.

8. The combination, with a load-receiver, of a pair of closers therefor; a toggle extending from one closer to the other for locking the closers; a counterweighted toggle-breaker; and a detent for normally engaging the toggle-breaker.

9. The combination, with weighing mechanism including a load-receiver, of a plurality of closers for said load-receiver; a toggle extending from one closer to another for locking the closers; a gravitative toggle-breaker mounted on the load-receiver and connected with the toggle; a detent for normally holding the toggle-breaker against action; and means for tripping said detent.

10. The combination, with weighing mechanism including a load-receiver, of a series of tubular closers; a toggle for locking the closers; a gravitative toggle-breaking device connected with the toggle; a detent for normally holding the toggle-breaking device out of action; a supply apparatus; and means operative with the supply apparatus for tripping said detent.

11. The combination, with weighing mechanism including a load-receiver, of a plurality of closers therefor, each having an upright arm; a toggle the members of which are connected with said arms; a toggle-breaking device mounted upon the load-receiver; a rod connecting the toggle-breaking device and the toggle; and a detent for normally holding the toggle-breaking device out of action.

12. The combination, with weighing mechanism including a load-receiver, of a plurality of closers for said load-receiver; a dead-lock toggle the respective members of which are connected with the two closers; a counterweighted lever mounted upon the load-receiver; a connection between said lever and the toggle; and a detent for engaging the counterweighted lever.

13. The combination, with weighing mechanism including a load-receiver, of a plurality of tubular closers therefor fitting against each other to prevent the escape of material; and closer-retarding mechanism coöperating with the closers.

14. The combination, with weighing mechanism including a load-receiver, of a series of tubular closers for said load-receiver, fitting against each other to prevent the escape of material; and regulator-plates connected to, and extending at an angle from, the respective lower walls of the two closers.

15. The combination, with weighing mechanism, of two fixed spout-sections; an intermediate movably-mounted spout-section; and means controlled by the weighing mechanism for continuously vibrating said movably-mounted spout-section during the weighing of a load.

16. The combination, with weighing mechanism, of two fixed spout-sections; an intermediate, movably-mounted annular spout-section; and means controlled by the weighing mechanism for positively operating said movably-mounted spout-section during the weighing of a load.

17. The combination, with weighing mechanism, of two fixed spout-sections; an intermediate, movably-mounted spout-section; and means controlled by the weighing mechanism for transversely reciprocating said movably-mounted spout-section during the weighing operation.

18. The combination, with weighing mechanism including a load-receiver, of stream-supplying means including a spout-section; a plurality of links suspending said spout-section from the framework; a crank-shaft connected with said spout-section; and means controlled by the weighing mechanism for operating said crank-shaft.

19. The combination, with weighing mechanism including a load-receiver, of stream-supplying apparatus including two fixed spout-sections and an intermediate movably-mounted spout-section; links for suspending said movably-mounted spout-section from the framework; a crank-shaft connected with the movably-mounted spout-section; and mechanism controlled by the weighing mechanism for rotating said shaft during the weighing of a load.

20. The combination, with weighing mechanism, of two fixed spout-sections; an intermediate movably-mounted tubular spout-section; mechanism for transversely vibrating said movably-mounted spout-section a number of times during the weighing of a load; driving mechanism including a shaft having a fixed pulley; a loose pulley on said shaft; a belt; and means for shipping said belt from each of the pulleys to the other, said means being controlled by the weighing mechanism.

21. The combination, with weighing mechanism including a load-receiver, of a supply-valve and its carrier mounted for movement in transverse directions; a crank-shaft; a ring embracing the crank-shaft; a link connected to said ring and having a ball at its opposite end fitted into a socket in the valve.

22. The combination, with weighing mechanism, of stream-supplying means; a carrier mounted for oscillation; a valve provided with an arm pivoted to said carrier and adapted to oscillate in a transverse direction to the carrier, said arm having a socket; a crank-shaft; a ring loosely embracing the crank-shaft; a link pivoted to said ring and provided with a ball at one end fitted into said socket; and means controlled by the weighing mechanism for operating said shaft.

FRANCIS H. RICHARDS.

Witnesses:
F. N. CHASE,
JOHN O. SEIFERT.